C. C. SINGER.
SEPARATING DEVICE.
APPLICATION FILED MAY 1, 1915.
1,176,863.
Patented Mar. 28, 1916.
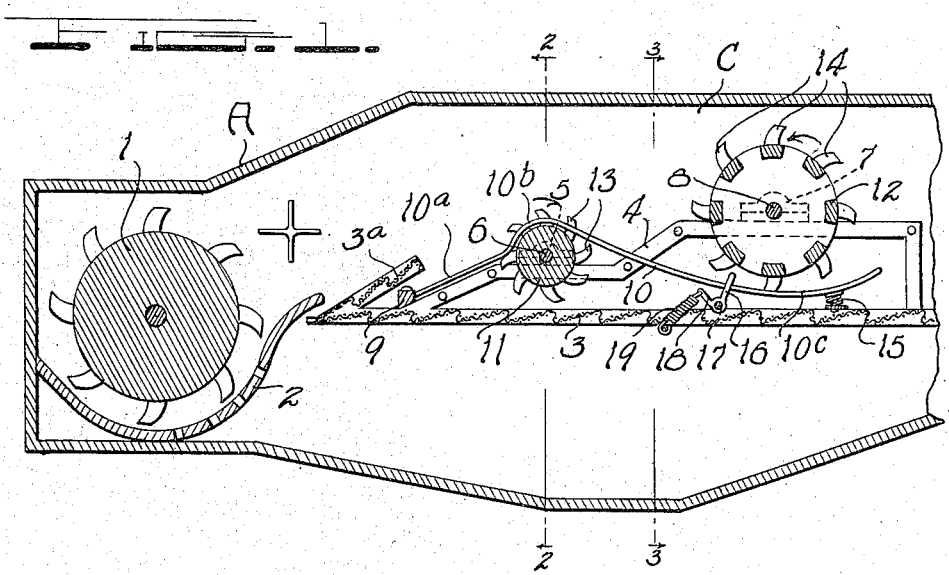
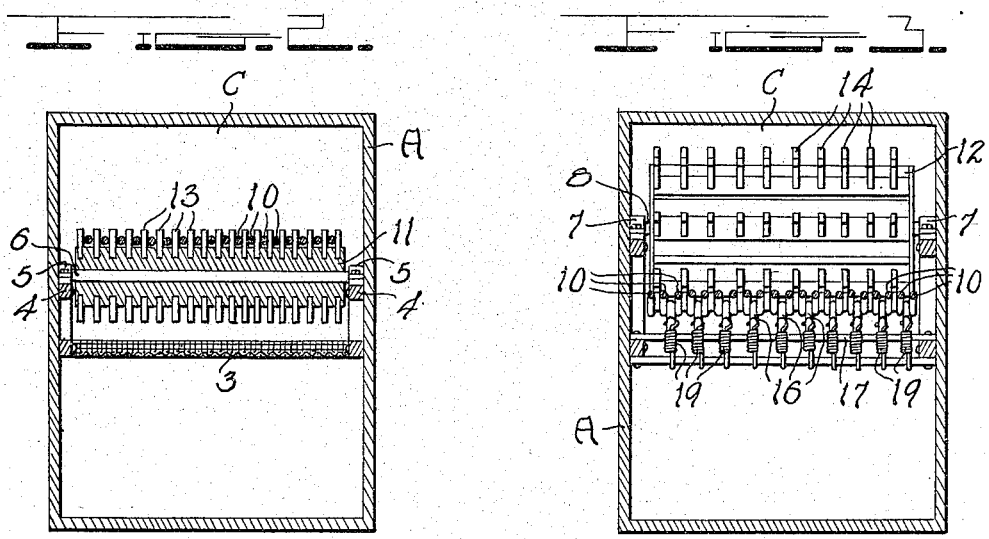
Witness
Harry B Rook
Inventor
C. C. Singer
By
N. S. Hie
Attorney

UNITED STATES PATENT OFFICE.

CHARLES C. SINGER, OF COLBY, KANSAS.

SEPARATING DEVICE.

1,176,863.
Specification of Letters Patent.
Patented Mar. 28, 1916.

Application filed May 1, 1915. Serial No. 25,161.

*To all whom it may concern:*

Be it known that I, CHARLES C. SINGER, a citizen of the United States, residing at Colby, in the county of Thomas and State of Kansas, have invented certain new and useful Improvements in Separating Devices, of which the following is a specification.

The present invention relates to a device for separating grain from the straw and chaff, and has for its object to provide a device of this character which can be readily placed in any separator and will operate in an effective manner to increase the efficiency thereof and save much of the grain which would otherwise be lost.

Further objects of the invention are to provide a device of this character which is comparatively simple and inexpensive in its construction, which will operate effectively upon the material as it is received from the usual cylinder and concave, which will not become clogged at critical times so as to interfere with the rapid action of the separator, and which can be applied as an attachment to the ordinary grain separators now in use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a vertical longitudinal sectional view through a separator constructed in accordance with the invention. Fig. 2 is a transverse sectional view on the line 2—2 of Fig. 1, looking in the direction of the arrows. Fig. 3 is a similar view on the line 3—3 of Fig. 1.

Referring to the drawings, the reference character A designates a grain separator of the conventional construction. The usual cylinder 1 and concave 2 is located at one end thereof, the straw being delivered from the concave to a straw rack 3 which is arranged within the separating chamber C.

The invention is illustrated as embodied in an attachment which is adapted to be mounted within the separating chamber C in such a manner as to receive the straw from the inclined portion 3ª of the straw rack. The device includes side frames 4 which are adapted to be bolted or otherwise rigidly secured to the side walls of the separating chamber C. These side frames 4 are formed with corresponding front bearings 5 within which a transverse shaft 6 is journaled, and corresponding rear bearings 7 which are arranged at a higher elevation than the bearings 5, and have a transverse shaft 8 journaled therein. The lower edges of the side frames 4 are at substantially the same elevation as the straw rack 3, and the side frames are connected at their forward ends by a transverse toe bar 9 to which the forward ends of a series of longitudinally extending and slightly spaced rods 10 are secured.

The various longitudinally extending rods 10 are all bent or shaped in an identical manner and coöperate with each other to provide a separating frame extending transversely across the full width of the separating chamber C. The forward ends of the rods 10 are straight and inclined upwardly and rearwardly as indicated at 10ª, intermediate portions of the rods being curved at 10ᵇ to provide a convex formation fitting around the top of a beater cylinder 11 mounted upon the shaft 6, while the rear ends of the rods 10 are reversely curved to provide a concave portion 10ᶜ extending under the beater cylinder 12 which is mounted upon the shaft 8. The beater cylinders 11 and 12 revolve in the directions indicated by the arrows, the cylinder 11 being provided with the radial teeth 13 adapted to project between the bars 10 and engage the straw, while the beater cylinder 12 is provided with similar teeth 14 adapted to engage the straw and move it rearwardly upon the longitudinal rods 10. The teeth of the beater cylinders serve both to agitate the straw so as to facilitate separation of the grain thereof, and also to move the straw rearwardly along the rods 10.

The rods 10 are preferably formed of material having a slight amount of resiliency, the forward ends thereof being rigidly connected to the transverse bar 9, while the rear end portions thereof are yieldably supported by means of suitable springs 15. The bars are thus adapted to have a limited amount of vibration, and the rear ends thereof normally tend to spring upwardly in such a manner as to force the straw against the beater cylinder 12 and cause the teeth 14 thereof to operate in the most effective manner upon the straw.

Projecting upwardly through the rods 10 at the concave portion 10ᶜ thereof is a series of fingers 16 which serve to check and retard the straw until a bunch of the straw has collected. These fingers 16 are yieldably mounted so that as soon as a sufficient quantity of the straw has been collected they will swing downwardly and rearwardly so as to release the straw. In the present instance the fingers 16 are shown as pivoted at their lower ends, as indicated at 17, and provided with arms 18 which are connected to springs 19. The resilience of the springs normally swings the fingers 16 upwardly into operative position so that they project above the rods 10 and retard the passage of the straw. However, as soon as the straw gets headed or bunched so as to be forcibly engaged by the teeth 14 of the beater cylinder 12, the teeth 16 swing downwardly and rearwardly so as to release the straw. The combined operation of the various parts of the device acts upon the straw in a most effective manner so as to separate the grain therefrom.

Having thus described the invention, what I claim as new and desire to secure by Letters Patent, is:—

1. A device of the character described, including a supporting frame adapted to be mounted within the separating chamber of a threshing machine, a separating frame including a series of longitudinally extending and slightly spaced rods having the forward ends thereof rigidly secured to the supporting frame, while the rear ends thereof are free to vibrate, said rods being correspondingly curved upwardly at an intermediate point in their length to provide a convex portion and correspondingly curved downwardly at their rear ends to provide a concave portion, yielding supports of the rear ends of the rods, a transversely disposed beater cylinder arranged under the convex portion of the separating frame, teeth projecting from the periphery of the said beater cylinder and arranged to travel between the spring bars as the cylinder is revolved, a second beater cylinder extending transversely across the spring rods and arranged over the concave portion thereof, teeth projecting from the second beater cylinder and adapted to travel between the spring rods, and a transverse series of yieldably mounted spring retarding fingers projecting upwardly through the spring rods into coöperative relation with the teeth of the second beater cylinder.

2. A device of the character described including a supporting frame adapted to be mounted within the separating chamber of a threshing machine, a separating frame including a series of longitudinally extending and slightly spaced spring rods which are rigidly secured at their forward ends to the supporting frame, while the rear ends thereof are free to vibrate, the rods being inclined downwardly at their forward ends and being correspondingly bent upwardly at an intermediate point in their length to provide a convex portion, while the rear ends thereof are correspondingly bent downwardly to provide a concave portion, yielding supports for the rear ends of the spring rods, a transversely disposed beater cylinder arranged under the concave portion of the separating frame, teeth projecting from the beater cylinder and arranged to travel between the spring rods, a second beater cylinder arranged under the concave portion of the separating frame, teeth projecting from the second beater cylinder and arranged to travel between the spring rods, and transverse series of yieldably mounted retarding fingers projecting upwardly between the spring rods into coöperative relation with the teeth of the second beater cylinder.

In testimony whereof I affix my signature in presence of two witnesses.

CHARLES C. SINGER.

Witnesses:
E. H. BENSON,
ASA M. SMITH.

Copies of this patent may be obtained for five cents each, by addressing the "Commissioner of Patents, Washington, D. C."